Figure 1:
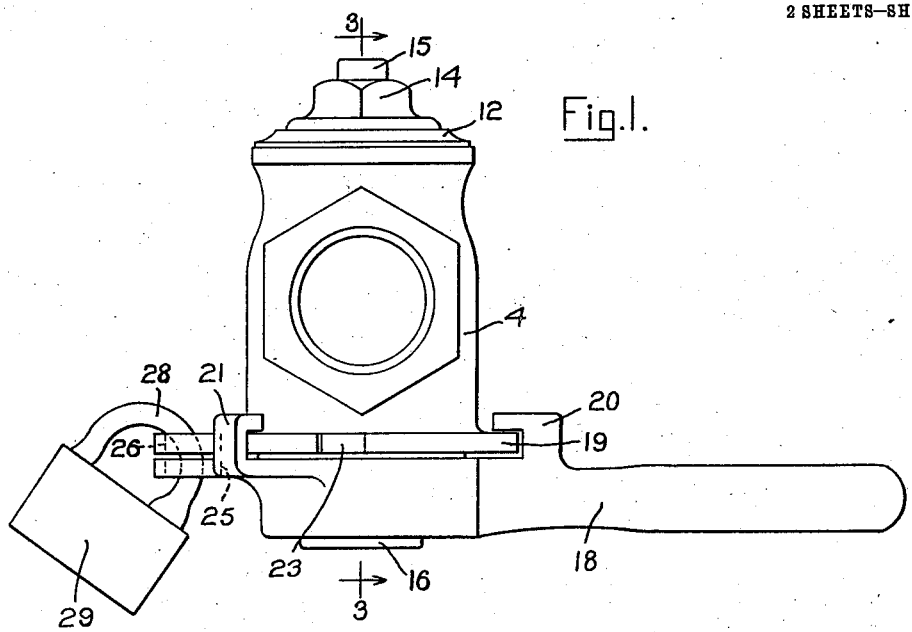

W. H. BEES.
LOCK VALVE.
APPLICATION FILED SEPT. 13, 1910.

1,014,203.

Patented Jan. 9, 1912.

2 SHEETS—SHEET 1.

Witnesses
George E. Higham.
Leonard W. Novander.

Inventor
William H. Bees
By Brown Williams
Attorneys

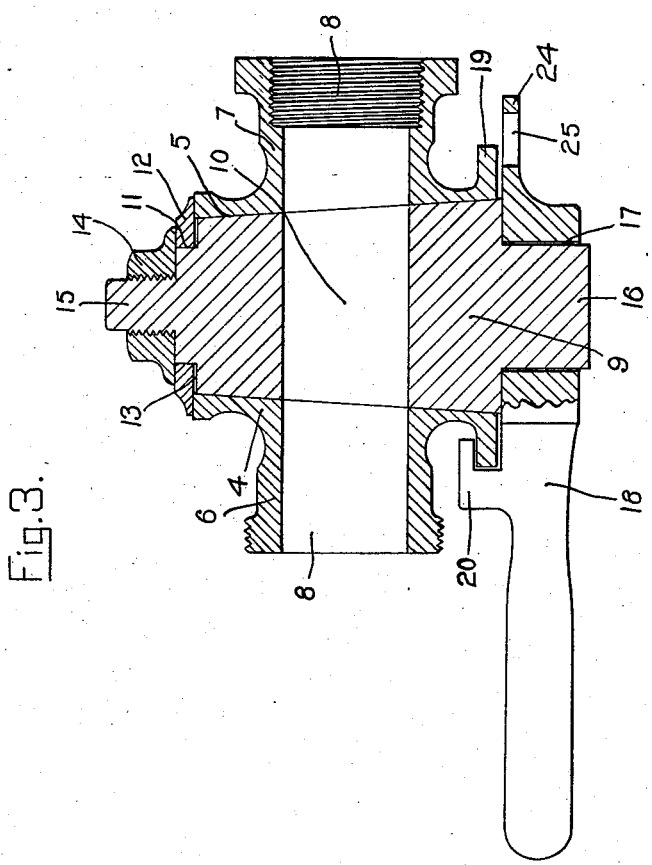

UNITED STATES PATENT OFFICE.

WILLIAM H. BEES, OF CHICAGO, ILLINOIS, ASSIGNOR TO GOETZ & FLODIN MANUFACTURING COMPANY, OF CHICAGO, ILLINOIS, A CORPORATION OF ILLINOIS.

LOCK-VALVE.

1,014,203.  Specification of Letters Patent.  Patented Jan. 9, 1912.

Application filed September 13, 1910. Serial No. 581,797.

*To all whom it may concern:*

Be it known that I, WILLIAM H. BEES, a citizen of the United States, residing at Chicago, in the county of Cook and State of Illinois, have invented a certain new and useful Improvement in Lock-Valves, of which the following is a full, clear, concise, and exact description, reference being had to the accompanying drawings, forming a part of this specification.

My invention relates to stop cocks and is more particularly concerned with those types which are adapted to be locked against tampering and unwarranted manipulation. Devices of this kind are employed where pipe lines are to be under the exclusive control of certain authorities who are in possession of the key by means of which the valve is released for operation. At all other times it is desired that the valve remain absolutely untouched. The very construction of the operative elements of valves of this kind has made it impossible in the prior art, so far as I am aware, to place the valve absolutely under the control of the lock. In other words, it is impossible to guard against taking the valve apart or at least relatively loosening parts of the valve to secure a kind of operation. The importance of this will be apparent when it is considered that the authorities usually desire that the lock valve be kept closed, for if it is possible to loosen the parts, more or less of a passage in the pipe line will be afforded. Since padlocks are usually used for the purposes above pointed out, it is clear that if no other locking means were provided, it would be possible to loosen the parts and thus allow the movable element of the valve to separate from the stationary element to the extent of the play usually allowed by such locks. It is probably possible that the valve itself could be so constructed that its parts could not be separated unwarrantedly, but attempts in this direction have always been met with such difficulties that a practical commercial device has not been provided.

To the end of obviating the difficulties above pointed out, my invention provides means whereby the movable element of the valve is locked against any separation whatever from the stationary element when the usual padlock is applied, thus insuring the authorities against felonious tampering. This is particularly useful when the valve is closed in normal condition, but it will be apparent that my invention is also useful when the normal condition of the valve is the open one.

Specifically, my invention provides engaging means between the movable element of the valve and the stationary element thereof which confine the movable element absolutely to one movement which is well controlled by the padlock arrangement, and this whether or not the usual removable parts of the valve be taken off in an attempt to get unauthorized operation.

My invention is embodied in the device illustrated in the accompanying drawings, in which—

Figure 2:
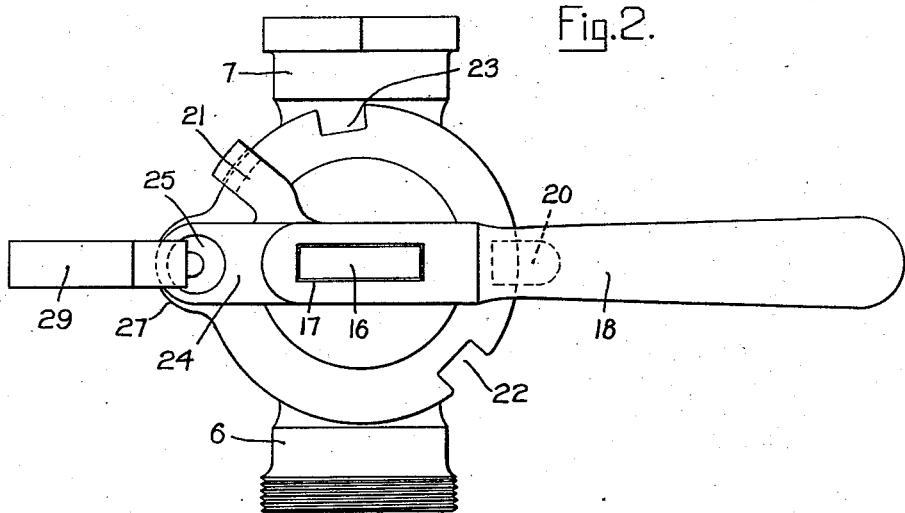

Figure 1 is an end elevational view thereof, the valve being closed and being locked in that position; Fig. 2 is a bottom view thereof; and Fig. 3 is a sectional view taken on the plane of the line 3, 3 of Fig. 1, looking in the direction indicated by the arrows, the valve, however, being released and opened.

Like reference characters are applied to the same parts throughout the various figures.

The valve casing 4 is provided with the tapering bore 5 and has diametrically opposite bosses 6 and 7 which are formed to act as coupling members and have the alining bores 8, 8, all as will be readily understood by those skilled in the art. The valve plug 9 is ground to fit the tapering bore 5 and is provided with the transverse bore 10 adapted to register simultaneously with the bores 8, 8. The plug 9 is reduced at 11 to receive the clamping ring 12, with which it forms the oil box 13, this ring being held upon the casing 4 by means of a nut 14 threaded upon the further reduced portion 15 of the plug 9. It is clear that the parts thus far described maintain the plug 9 rotatably within the bore 5 and that the plug may be made to occupy a position to connect the bores 8, 8 or a position to cut off communication between them. The other end of the plug 9 is provided with a handle and, while the latter might well be integral therewith, it has been found convenient to make it removable therefrom particularly for convenience in construction; and I have therefore shown the removable type in the accompanying drawings. Thus, the plug 9 is provided with the rectangular, preferably axial, lug 16, which is adapted to be received by an opening 17 in the handle 18 extending radially from the axis.

It will be noted that, in the plane just above the handle, the casing 4 is provided with the annular flange 19 and that the handle 18 is provided with hook members 20 and 21 which engage over the flange, as clearly illustrated in Figs. 1 and 3. The handle is put in place by first passing the two hooks simultaneously through the two notches 22 and 23, which are disposed relatively as are the hooks 20 and 21, respectively, the handle being then turned somewhat in the manner of a bayonet connection. It will be clear that, except when the hooks 20 and 21 register with the notches 22 and 23, respectively, the handle will form an effective yoke holding the plug against removal from the casing 4, and even from loosening therefrom, and confining the plug to rotation and nothing else. The hub of the handle is provided with an extension 24, extending oppositely from the handle itself, and this extension is provided with an opening 25 which is adapted to register with an opening 26 in an enlargement 27 provided at a proper point on the periphery of the flange 19, depending upon the desired normal position of the valve. The openings 25 and 26 registering, they are adapted for the reception of the hasp 28 of the padlock 29, as shown in Fig. 1. It might well be noted here that the notches 22 and 23 are disposed so that they will not register with the hooks 20 and 21 when the movable element is in its normal position, and it is preferable that they do not register with the hooks when the movable element is in its full alternative position, for then they will permit release of the handle only in an odd position in which the movable element will probably never be placed.

As before described, the hooks 20 and 21 absolutely confine the movable element to rotation alone, and it will be clear from the foregoing that the padlock effectually prevents any rotation which might not be negligible. It is clear that if the hooks 20 and 21 and the associated flange were not provided, the nut 14 being exposed, could be removed and the plug given a sharp hammer blow to separate it from the casing to the extent of the play between the padlock hasp 28 and the parts 24 and 27 so as to afford communication between the passages 8, 8 even though the plug is turned so that the bore 10 is at right angles to the passages 8, 8. It is to be noted that it is in this position that the lock is applied in the present instance. With the hooks provided, however, it would be impossible to remove the plug from the casing or loosen it therefrom even though the nut 14 were removed, for this is possible only when the hooks are in register with the notches in the flange; and the padlock normally effectively prevents such register.

While the valve of my invention is particularly useful when its normal position is the closed position, it is possible that it might also be advantageously employed where the open position is the normal one, and I therefore wish it to be understood that I contemplate its use and association wherever applicable.

I claim as new and desire to secure by Letters Patent:

1. In combination, a valve casing provided with a longitudinal passage and a tapered transverse passage, a flange on said casing surrounding the larger end of said transverse passage, a correspondingly shaped plug rotatably disposed in said transverse passage, said plug having a transverse opening adapted to aline with said longitudinal passage, a flat-sided stud on the larger end of said plug, a wrench having a central portion adapted to fit said stud, a handle extending from said central portion, a lug extending from said central portion and having an opening therein, the opening in said lug being adapted to aline with an opening in said flange, hook-shaped lugs extending from said wrench and adapted to engage over said flange to prevent longitudinal movement of the plug, said flange being provided with notches for the passage of said hook-shaped lugs when said wrench is in a position intermediate of its on and off positions, and a lock having a hasp adapted to pass through the opening in said first named lug and the alining opening in said flange so as to prevent rotary movement of said plug.

2. In combination, a valve casing provided with a longitudinal passage and a tapered transverse passage, a flange on said casing surrounding the larger end of said transverse passage, a correspondingly shaped plug rotatably disposed in said transverse passage, said plug having a transverse opening adapted to aline with said longitudinal passage, a flat-sided stud on the larger end of said plug, a wrench having a central portion adapted to fit said stud, a handle extending from said central portion, a lug extending from said central portion and having an opening therein, the opening in said lug being adapted to aline with an opening in said flange, hook-shaped lugs extending from said wrench and adapted to engage over said flange to prevent longitudinal movement of the plug, said flange being provided with notches for the passage of said hook-shaped lugs when said wrench is in a position intermediate of its on and off positions, a lock having a hasp adapted to pass through the opening in said first named lug and the alining opening in said flange so as to prevent rotary movement of said plug, and a washer secured to the smaller end of said plug and forming a flange engaging the face of the casing around the smaller end of said transverse opening.

In witness whereof, I hereunto subscribe my name this 7th day of September, A. D. 1910.

WILLIAM H. BEES.

Witnesses:
ARTHUR H. BOETTCHER,
HUGO L. GOETZ.

Copies of this patent may be obtained for five cents each, by addressing the "Commissioner of Patents, Washington, D. C."